US010585443B2

(12) United States Patent
Fearn (10) Patent No.: US 10,585,443 B2
(45) Date of Patent: Mar. 10, 2020

(54) SUBLIMATOR CONTROL VALVE SYSTEM (71) Applicant: Goodrich Corporation, Charlotte, NC (US)

(72) Inventor: Benjamin Fearn, West Hartford, CT (US)

(73) Assignee: GOODRICH CORPORATION, Charlotte, NC (US)

( * ) Notice: Subject to any disclaimer, the term of this patent is extended or adjusted under 35 U.S.C. 154(b) by 206 days.

(21) Appl. No.: 15/873,562

(22) Filed: Jan. 17, 2018

(65) Prior Publication Data
US 2019/0220047 A1 Jul. 18, 2019

(51) Int. Cl.
G05D 23/19 (2006.01)
G05D 23/20 (2006.01)
B01D 7/00 (2006.01)
F25B 49/00 (2006.01)
F16K 31/04 (2006.01)
B01D 19/04 (2006.01)
F16K 37/00 (2006.01)
F25B 19/04 (2006.01)
B64G 1/50 (2006.01)

(52) U.S. Cl.
CPC ........... G05D 23/2037 (2013.01); B01D 7/00 (2013.01); B01D 19/0409 (2013.01); B01D 19/0418 (2013.01); F16K 31/046 (2013.01); F16K 37/005 (2013.01); F16K 37/0041 (2013.01); F25B 19/04 (2013.01); F25B 49/00 (2013.01); B64G 1/503 (2013.01); F25B 2600/01 (2013.01); F25B 2600/25 (2013.01)

(58) Field of Classification Search
CPC ......... F25B 19/00; F25B 19/04; F28F 13/003; B64G 1/503
See application file for complete search history.

(56) References Cited

U.S. PATENT DOCUMENTS 3,635,216 A    1/1972  Curtis
6,578,367 B1 * 6/2003  Schaefer ................. F25D 3/102
                                                       62/51.1

(Continued)

OTHER PUBLICATIONS

"ECS Equipment—Heat Transport Section." NASA, NASA, Feb. 1, 2001, https://www.hq.nasa.gov/alsj/alsj-ECSEquipHeat.html. (Year: 2001).*

Primary Examiner — Jonathan Bradford
(74) Attorney, Agent, or Firm — Snell & Wilmer, L.L.P.

(57) ABSTRACT

A sublimator control valve system may include a sublimator having an injection port, a feedwater supply, a first solenoid valve in fluid communication with the feedwater supply and the injection port of the sublimator, a first sensor in electronic communication with a first controller, the first sensor configured to measure at least one of a first pressure parameter or a first temperature parameter; and a first tangible, non-transitory memory configured to communicate with the first controller, the tangible, non-transitory memory having instructions stored thereon that, in response to execution by the first controller, cause the first controller to perform operations comprising receiving, by the first controller, a command signal and the first pressure parameter, and controlling, by the first controller, the first solenoid valve in response to at least one of the command signal or the first pressure parameter.

12 Claims, 5 Drawing Sheets (56) References Cited

U.S. PATENT DOCUMENTS

| | | | |
|---|---|---|---|
| 7,604,782 B1* | 10/2009 | Dingell | F25B 19/00 23/294 R |
| 8,753,716 B2 | 6/2014 | Soininen et al. | |
| 2015/0107800 A1* | 4/2015 | Tang | F28D 20/0056 165/96 |

* cited by examiner

SUBLIMATOR CONTROL VALVE SYSTEM

FIELD

The present disclosure relates to spacecraft cooling systems, and, more specifically, to systems and methods for sublimator control.

BACKGROUND

Spacecraft systems tend to generate heat which may be rejected to the environment as waste heat. A spacecraft cooling system may comprise a sublimator having a control system comprising a sub-ambient regulator to regulate a sublimator feedwater supply. Sub-ambient regulators tend to be mechanically complex and tend to have a narrow operating pressure range and, in this regard, tend to be at risk of to freeze-up or breakthrough during low vacuum or high inlet pressure conditions.

SUMMARY

In various embodiments, a sublimator control valve system may comprise a sublimator having an injection port, a feedwater supply, a first solenoid valve in fluid communication with the feedwater supply and the injection port of the sublimator, a first sensor in electronic communication with a first controller, the first sensor configured to measure at least one of a first pressure parameter or a first temperature parameter, and a first tangible, non-transitory memory configured to communicate with the first controller, the first tangible, non-transitory memory having instructions stored thereon that, in response to execution by the first controller, cause the first controller to perform operations comprising receiving, by the first controller, a command signal and the first pressure parameter, and, controlling, by the first controller, the first solenoid valve in response to at least one of the command signal or the first pressure parameter.

In various embodiments, the operations further comprise determining, by the first controller, a startup time and controlling, by the first controller, the first solenoid valve in response to at least one of the startup time, the first pressure parameter, a first pressure threshold, and a feedwater pressure. In various embodiments, the operations further comprise determining, by the first controller, a steady state condition of the sublimator. In various embodiments, the steady state condition is determined by the first controller in response to at least one of the first pressure parameter, a second pressure threshold, the temperature parameter, a temperature threshold, or a steady state time function. In various embodiments, the operations further comprise controlling, by the first controller, the first solenoid valve in response to the steady state condition. In various embodiments, the controlling, by the first controller, the first solenoid valve in response to the steady state condition further comprises calculating, by the first controller, a measured amount of feedwater, opening, by the first controller, the first solenoid valve for a calculated duration and injecting, by the first controller, the measured amount of feedwater into the sublimator through the injection port. In various embodiments, the measured amount of feedwater is dynamically modulated, by the first controller, in response to at least one of the first pressure parameter, a feedwater pressure, the temperature parameter, or the second pressure threshold. In various embodiments, the operations further comprise determining, by the first controller, a breakthrough event in response to a change in a rate of change of the first pressure parameter and controlling, by the first controller, the first solenoid valve. In various embodiments, the sublimator control valve system further comprises a first isolation valve in fluid communication with the feedwater supply and the first solenoid valve, wherein the first isolation valve is configured to interrupt the fluid communication between the first solenoid valve and the feedwater supply. In various embodiments, the sublimator control valve system further comprises a second solenoid valve in fluid communication with the feedwater supply and the injection port of the sublimator, a second isolation valve in fluid communication with the second solenoid valve and the feedwater supply, wherein the second isolation valve is configured to interrupt the fluid communication between the second solenoid valve and the feedwater supply, a second sensor in electronic communication with a second controller, the second sensor configured to measure a second pressure parameter, and a second tangible, non-transitory memory configured to communicate with the second controller, the second tangible, non-transitory memory having instructions stored thereon that, in response to execution by the second controller, cause the second controller to perform operations comprising receiving, by the second controller, a command signal and the second pressure parameter, and, controlling, by the second controller, the second solenoid valve in response to at least one of the command signal or the second pressure parameter.

In various embodiments, a method for controlling a sublimator system is provided. The method may comprise receiving, by a controller, a command signal and receiving, by the controller, at least one of a first sublimator system parameter or a second sublimator system parameter from a sensor in electronic communication with the controller, and controlling, by the controller, a solenoid valve in response to at least one of the command signal, the first sublimator system parameter, or the second sublimator system parameter, wherein the first sublimator system parameter and the second sublimator system parameter comprise measured characteristics of a spacecraft cooling system having a sublimator control valve system comprising a sublimator having an injection port, a feedwater supply, and the solenoid valve in fluid communication with the feedwater supply and the injection port of the sublimator.

In various embodiments, the method may also comprise determining, by the controller, a startup time and controlling, by the controller, the solenoid valve in response to at least one of the startup time, the first sublimator system parameter, a first pressure threshold, and a feedwater pressure. In various embodiments, the method may also comprise determining, by the controller, a steady state condition of the sublimator. In various embodiments, the steady state condition is determined by the controller in response to at least one of the first sublimator system parameter, a second pressure threshold, the second sublimator system parameter, a temperature threshold, or a steady state time function. In various embodiments, the method may also comprise controlling, by the controller, the solenoid valve in response to the steady state condition. In various embodiments, the controlling, by the controller, the solenoid valve in response to the steady state condition further comprises calculating, by controller, a measured amount of feedwater, opening, by the controller, the solenoid valve for a calculated duration and injecting, by the controller, the measured amount of feedwater into the sublimator through the injection port. In various embodiments, the method may also comprise dynamically modulating, by the controller, the measured amount of feedwater in response to at least one of the first sublimator system parameter, a feedwater pressure, the second sublimator system parameter, or the second pressure threshold.

In various embodiments an article of manufacture is provided. The article of manufacture may include a tangible, non-transitory computer-readable storage medium having instructions stored thereon that, in response to execution by a processor, cause the processor to perform operations comprising receiving, by the processor, a command signal and receiving, by the processor, at least one of a first sublimator system parameter or a second sublimator system parameter from a first sensor in electronic communication with the processor wherein the first sublimator system parameter and the second sublimator system parameter comprise measured characteristics of a spacecraft cooling system having a sublimator control valve system comprising a sublimator having an injection port, a feedwater supply, a solenoid valve in fluid communication with the feedwater supply and the injection port of the sublimator, and controlling, by the processor, the solenoid valve in response to at least one of the command signal or the first sublimator system parameter.

In various embodiments, the article of manufacture may further comprise the operations of determining, by the processor, a steady state condition of the sublimator in response to at least one of the first sublimator system parameter, a pressure threshold, the second sublimator system parameter, a temperature threshold, or a steady state time function, and controlling, by the processor, the solenoid valve in response to the steady state condition. In various embodiments, the controlling, by the processor, the solenoid valve in response to the steady state condition further comprises calculating, by the processor, a measured amount of feedwater, opening, by the processor, the solenoid valve for a calculated duration and injecting, by the processor, the measured amount of feedwater into the sublimator through the injection port.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

All ranges and ratio limits disclosed herein may be combined. It is to be understood that unless specifically stated otherwise, references to "a," "an," and/or "the" may include one or more than one and that reference to an item in the singular may also include the item in the plural.

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation.

The scope of the disclosure is defined by the appended claims and their legal equivalents rather than by merely the examples described. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, coupled, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

As used herein, "electronic communication" means communication of electronic signals with physical coupling (e.g., "electrical communication" or "electrically coupled") or without physical coupling and via an electromagnetic field (e.g., "inductive communication" or "inductively coupled" or "inductive coupling"). As used herein, "transmit" may include sending electronic data from one system component to another via electronic communication between the components. Additionally, as used herein, "electronic data" may include encompassing information such as commands, queries, files, data for storage, and the like in digital or any other form.

As used herein, "aft" refers to the direction associated with a tail (e.g., the back end) of a spacecraft, or generally, to the direction of the tail along the spacecraft roll axis. As used herein, "forward" refers to the direction associated with a nose (e.g., the front end) of the spacecraft, or generally, to the direction of the nose along the spacecraft roll axis.

Figure 1:
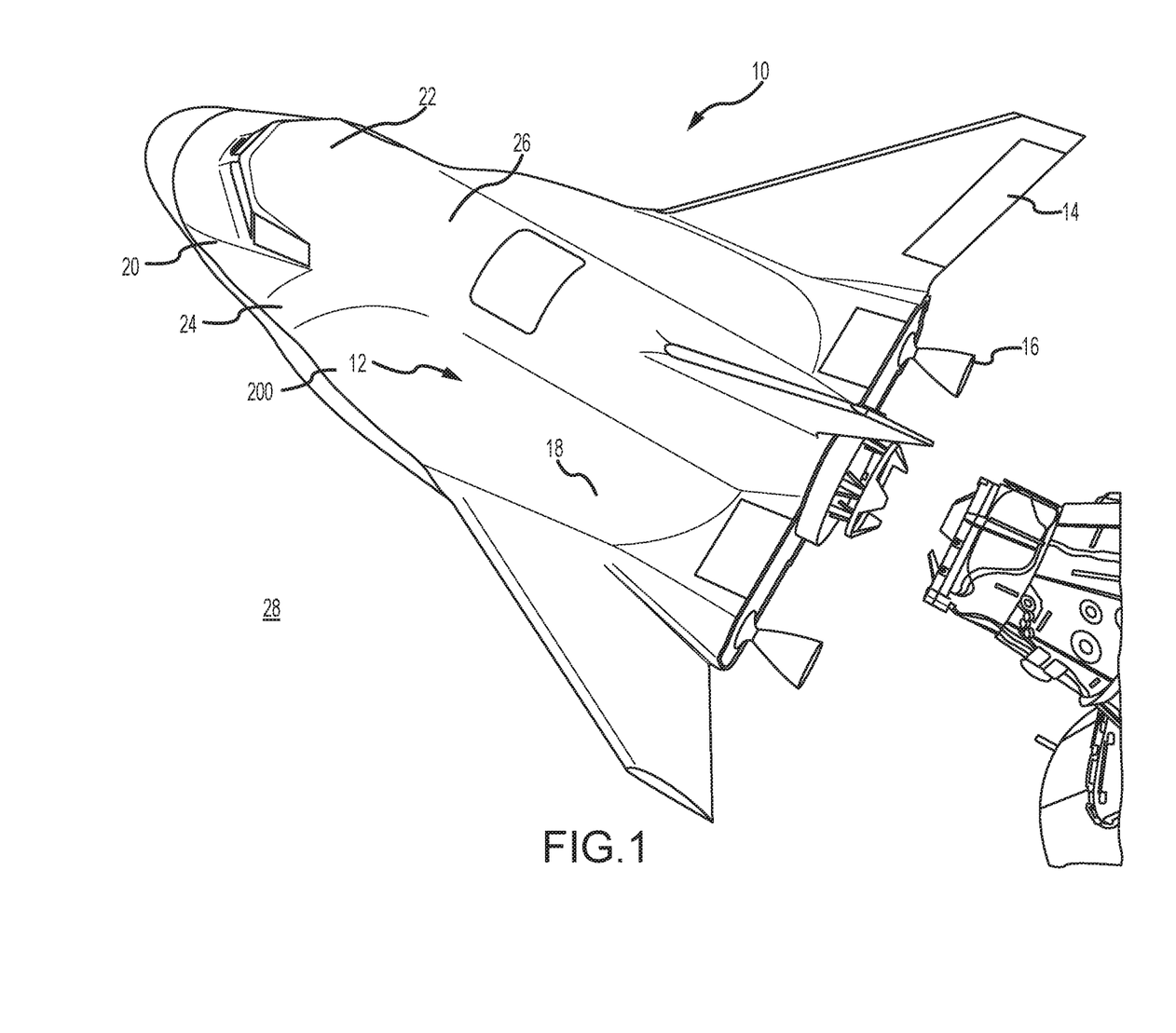
FIG. 1 illustrates a spacecraft, in accordance with various embodiments.

With reference to FIG. 1, a spacecraft 10 in accordance with various embodiments may comprise spacecraft systems 12 such as, for example, one or more control surfaces 14, one or more reaction motors 16, reaction wheels 18, flight computers 20, cockpit controls 22, life support systems 24, and an electrical power generation system 26. In various embodiments, spacecraft systems 12 tend to generate waste heat which may tend to cause an interior temperature of spacecraft 10 to rise to an undesirable or an unsafe level or may tend to cause spacecraft systems 12 to exceed an operating temperature threshold. In various embodiments, spacecraft 10 may comprise a cooling system 200 to collect waste heat and transport the waste heat from the spacecraft 10 to the spacecraft environment 28. In various embodiments, the spacecraft environment may be defined by pressure and temperature extremes (relative to atmospheric standard temperature and pressure) such as, for example, those pressure and temperature conditions above the Kármán line or where pressures fall below 5 torr [0.66 kPa].

Figure 2:
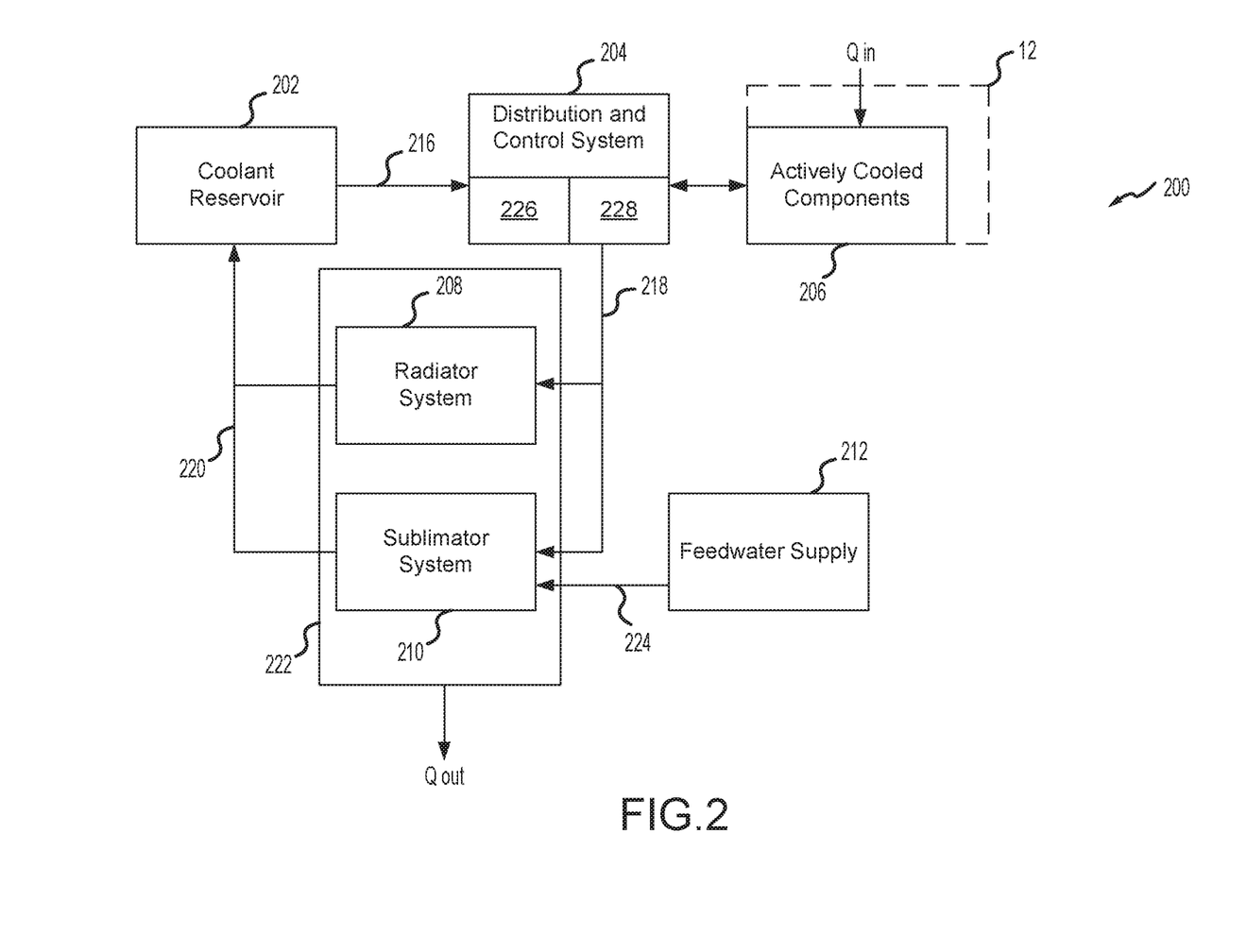
FIG. 2 illustrates a spacecraft cooling system comprising a sublimator control valve system, in accordance with various embodiments

In various embodiments and with additional reference to FIG. 2, a spacecraft cooling system 200 may comprise components in fluid and/or electronic communication such as a coolant reservoir 202, a coolant distribution and control system 204, a radiator system 208, and a sublimator system 210. In various embodiments, coolant distribution and control system 204 may comprise a controller 226 in electronic communication with cooling system 200 elements and one or more valves, pumps, coolant lines and sensors 228 in electronic communication with the controller 226. In various embodiments, controller 226 may be in electronic communication with a pilot through a control interface of cockpit controls 22, for example, a cooling control panel that the pilot can operate, which may output a command signal. Sensors 228 may be configured to transmit measured characteristics of spacecraft cooling system 200 to controller 226, thereby providing sensor feedback about the spacecraft cooling system 200 to controller 226. The sensor feedback may be, for example position feedback, temperature feedback, pressure feedback or other data. In various embodiments, coolant distribution and control system 204 may draw coolant 216 from coolant reservoir 202 for distribution to actively cooled components 206 of spacecraft systems 12 and, in response, actively cooled components 206 may heat coolant 216 (Q in) and return heated coolant 218. In various embodiments, coolant distribution and control system 204 may distribute heated coolant 218 to one or more heat rejection systems 222 such as a radiator system 208 and a sublimator system 210 having a sublimator control valve system. In various embodiments, heat rejection systems 222 may reject heat (Q out) and return chilled coolant 220 to coolant reservoir 202.

In various embodiments, radiator system 208 may tend to reject heat to the spacecraft environment 28 by radiation. In various embodiments, an efficiency of radiator system 208 in extracting heat from heated coolant 218 may be defined by a difference in temperature between the heated coolant and a radiator of radiator system 208. In various embodiments, efficiency may be lost as a radiator temperature approaches a heated coolant temperature and may reverse when where a radiator temperature is greater than a heated coolant temperature. In various embodiments, in response to aerodynamic heat loads from a launch of spacecraft 10, a radiator of radiator system 208 may carry a residual heat of launch tending thereby to have an elevated temperature and, in response, the efficiency of radiator system 208 may tend to drop. In various embodiments, controller 226 may calculate the efficiency of radiator system 208 in response to temperature inputs from sensors 228 such as a coolant temperature and a radiator temperature. In response to an efficiency loss of radiator system 208, controller 226 may control a sublimator system 210.

In various embodiments, sublimator system 210 has a sublimator control valve system comprising one or more valves and a solenoid valve in electronic communication with a controller such as controller 226 and in fluid communication with feedwater supply 212. At an initial condition (startup) of sublimator system 210, feedwater 224 is fed by the controller 226 at, for example, a constant rate (startup rate) through the solenoid valve to an injection port of a sublimator having a porous metal matrix exposed to the spacecraft environment 28. In response to exposure to the spacecraft environment, feedwater 224 is flash frozen, thereby forming a layer of ice which tends to collect within pores of the porous metal matrix tending, thereby to form a pressure seal between the injection port and the spacecraft environment 28. In response to the forming a layer of ice, a pressure at the injection port (which may be measured by sensors such as sensors 228) tends to rise above a first pressure threshold, such as the pressure of the spacecraft environment 28. In various embodiments, a heat exchanger is disposed within the porous metal matrix and heated coolant 218 is passed through the heat exchanger tending to give up heat to the layer of ice. In response to receiving heat from heated coolant 218, a portion of the ice layer sublimates and is vented at a vent tending thereby to give up heat to the spacecraft environment 28. In response to the sublimation of a portion of the ice layer, the pressure at the injection port may tend to drop.

In various embodiments in response to the pressure drop and to the sublimation of the portion of the ice layer, the controller may measure an amount of feedwater and the measured amount of feedwater 224 may be periodically added, by the controller, to the porous metal matrix to replenish the portion of the ice layer. In response to the periodic addition of the measured amount of feedwater, sublimator system 210 may transition to a steady state operation when the pressure at the injection port approaches a second pressure threshold, such as a constant pressure or steady state pressure. In various embodiments, the transition to steady state operation may be a function of feedwater flow rate, time, and the temperature of heated coolant 218. In various embodiments, the measured amount of feedwater may be defined by a feedwater pressure and a duration of the solenoid valve opening. In various embodiments, a rate of feedwater addition when sublimator system 210 in the steady state is lower than the constant rate when in the startup state. In various embodiments and in response to an injection port pressure excursion above a breakthrough pressure threshold, the ice layer may be cleared from the pores, tending to break the pressure seal and, in response, the injection port pressure drops to the pressure of the spacecraft environment 28. In various embodiments and in response to the injection port pressure drop, sublimator system 210 transitions out the steady state operation and the controller may provide feedwater at the startup rate to the injection port. In other words, sublimator system 210 may be said to experience a breakthrough event and may be restarted from the startup condition. In various embodiments, the controller may determine an occurrence of a breakthrough event in response to a change in a rate of change of a pressure parameter. In various embodiments, a breakthrough event may occur in response to a temperature rise in the heated coolant temperature which may tend to sublimate the ice layer thereby disrupting the pressure seal. In various embodiments and in response to a breakthrough event, the temperature of chilled coolant 220 may tend to rise.

Figure 3:
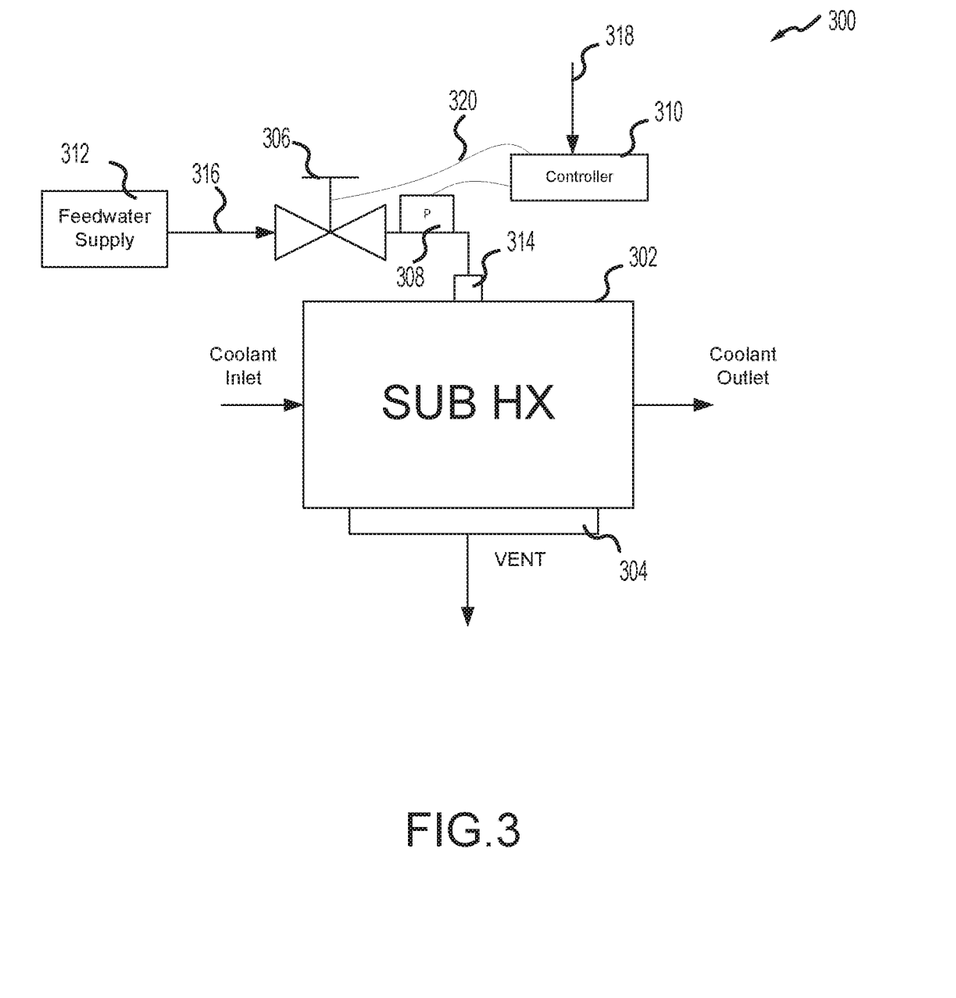
FIG. 3 illustrates a sublimator control valve system, in accordance with various embodiments

In various embodiments and with additional reference to FIG. 3, a sublimator control valve system 300 is provided and may comprise sublimator 302, having a vent 304 open to an environment, such as spacecraft environment 28, a solenoid valve 306, a sensor 308, and a controller 310. In various embodiments, solenoid valve 306 is in fluid communication with feedwater supply 312 and injection port 314 of sublimator 302 via feedwater lines 316. In various embodiments, sublimator control valve system 300 may comprise one or more feedback elements to monitor and measure system characteristics. For example, sensors 308 may be coupled to or in direct electronic communication with solenoid valve 306, sublimator 302, injection port 314, feedwater lines 316, or feedwater supply 312. Sensors 308 may comprise a temperature sensor, a pressure sensor, a position sensor, flow rate sensor, a level sensor, or any other suitable measuring device known to those skilled in the art. Sensors 308 may be configured to measure a characteristic of a sublimator control valve system or component. Sensors 308 may be configured to measure, for example, an injection port pressure, a feedwater flow rate, a solenoid valve position, a feedwater supply pressure, or a coolant temperature. Sensors 308 may be configured to transmit the measurements to controller 310, thereby providing sensor feedback about the sublimator control valve system to controller 310. The sensor feedback may be, for example position feedback, temperature feedback, pressure feedback or other data.

In various embodiments, controller 310 may be in electronic communication with a pilot or avionics through a control interface of cockpit controls 22, for example, a cooling control panel that the pilot can operate, which may output a command signal 318 or a second controller, such as controller 226, which may output the command signal 318. In various embodiments, the output command signal 318 may comprise instructions to command 'sublimator active' or 'sublimator inactive.' In various embodiments, controller 310 may be integrated into computer systems onboard a spacecraft. In various embodiments, controller 310 may be located proximate sublimator 302 or may be coupled to a housing of sublimator 302. In various embodiments, controller 310 may comprise a processor. In various embodiments, controller 310 may be implemented as and may include one or more processors and/or one or more tangible, non-transitory memories and be capable of implementing logic. Each processor can be a general purpose processor, a digital signal processor (DSP), an application specific integrated circuit (ASIC), a field programmable gate array (FPGA) or other programmable logic device, discrete gate or transistor logic, discrete hardware components, or any combination thereof.

System program instructions and/or controller instructions may be loaded onto a non-transitory, tangible computer-readable medium having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

In various embodiments, with combined reference to FIGS. 1 through 3, solenoid valve 306 may have a return to close spring. In various embodiments, solenoid valve 306 may be in electronic communication with and may be configured to receive electronic data from or be controlled via controller 310. In various embodiments, controller 310 may be configured to control solenoid valve 306 by control signals 320 issued in response to command signals 318 or sensor data from sensors 308. In various embodiments, in response to command signals 318 and/or input from sensors 308, controller 310 may cause solenoid valve 306 to open or close. In various embodiments, in response to a pressure parameter of injection port 314 controller 310 may control solenoid valve 306. In various embodiments and in response to the pressure parameter of injection and a first pressure threshold, such as a pressure of a spacecraft environment, controller 310 may control solenoid valve 306. In various embodiments and in response to the pressure parameter of injection port 314 and a second pressure threshold, such as a steady state pressure, controller 310 may control solenoid valve 306. In various embodiments, controlling solenoid valve 306 in response to the pressure parameter and the second pressure threshold may comprise opening solenoid valve 306 for a calculated duration which may be a function of a feedwater pressure. In various embodiments, controller 310 may dynamically modulate the calculated duration in response to the pressure parameter of injection port 314 or a temperature of heated coolant 218 and, in this regard may dynamically modulate the measured amount of feedwater injected through injection port 314 into sublimator 302. In various embodiments, controller 310 may control solenoid valve 306 in response to a time parameter, such as a startup time or a time to reach steady state. In various embodiments, controller 310 may control solenoid valve 306 in response to a breakthrough event.

Figure 4:
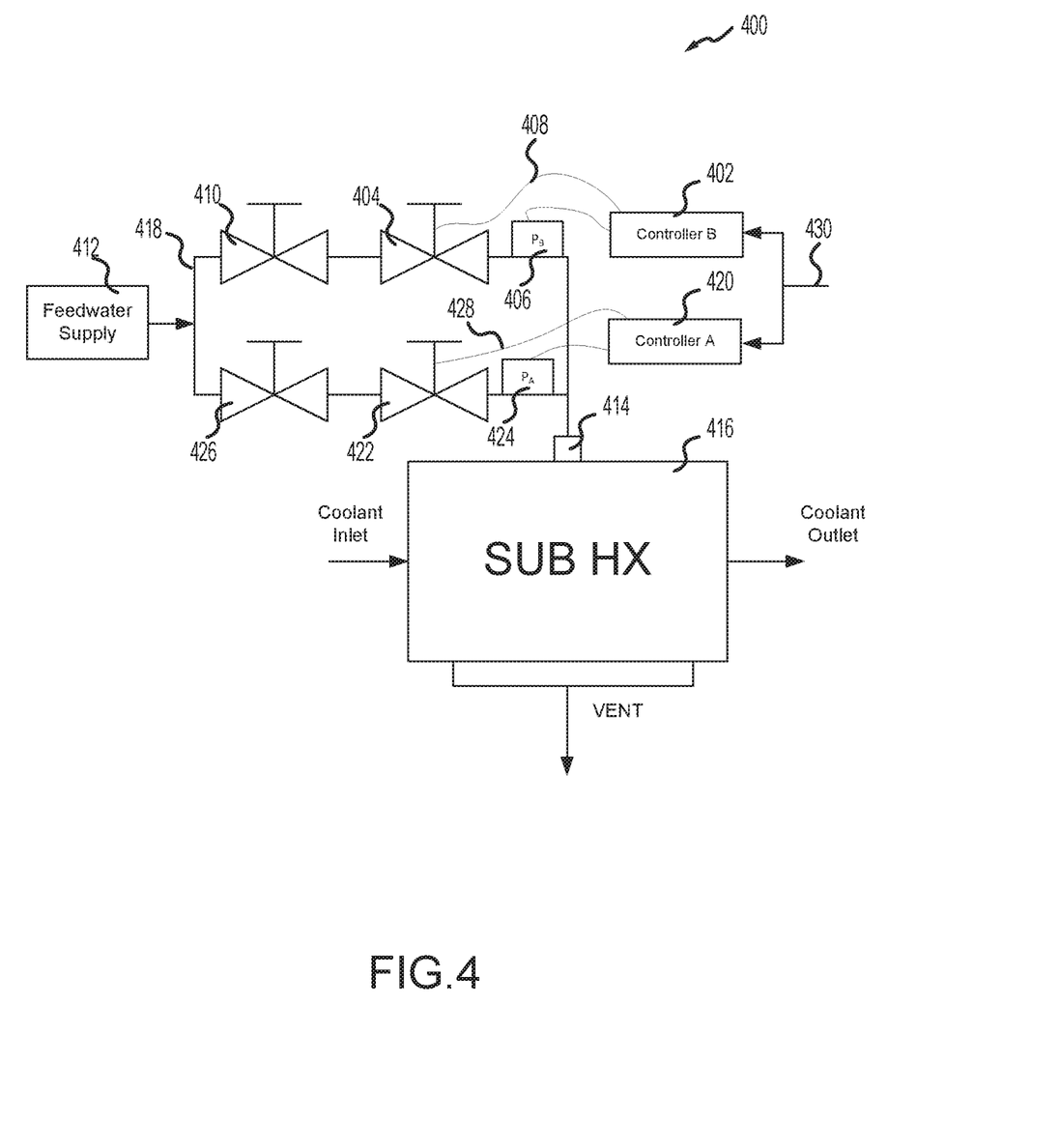
FIG. 4 illustrates a sublimator control valve system, in accordance with various embodiments.

In various embodiments and with additional reference to FIG. 4, a sublimator control valve system 400 is provided. Sublimator control valve system 400 comprises features, geometries, construction, manufacturing techniques, and/or internal components similar to sublimator control valve system 300 in addition to further elements tending to increase system reliability. Sublimator control valve system 400 comprises a first controller 402 in electronic communication with a first solenoid valve 404 and a first sensor 406. The first solenoid valve 404 is in fluid communication with a first isolation valve 410, a feedwater supply 412, and an injection port 414 of a sublimator 416 via feedwater lines 418. In various embodiments, a second controller 420 may be in electronic communication with a second solenoid valve 422 and a second sensor 424. The second solenoid valve 422 is in fluid communication with a second isolation valve 426, the feedwater supply 412, and the injection port 414 via feedwater lines 418. In various embodiments, first controller 402 is configured to control first solenoid valve 404 via control signals 408 and second controller 420 is configured to control second solenoid valve 422 via control signals 428. In various embodiments, first controller 402 may control first solenoid valve 404 and second controller 420 is configured to control second solenoid valve 422 in response to command signals 430. In various embodiments, first controller 402 may control first solenoid valve 404 in response to a first pressure parameter from the first sensor 406 and second controller 420 is configured to control second solenoid valve 422 in response to a second pressure parameter from the second sensor 424. In various embodiments, the first isolation valve 410 may be closed and, in response, first solenoid valve 404 may be isolated from feedwater supply 412. Similarly, second isolation valve 426 may be closed and, in response, second solenoid valve 422 may be isolated from feedwater supply 412.

Figure 5:
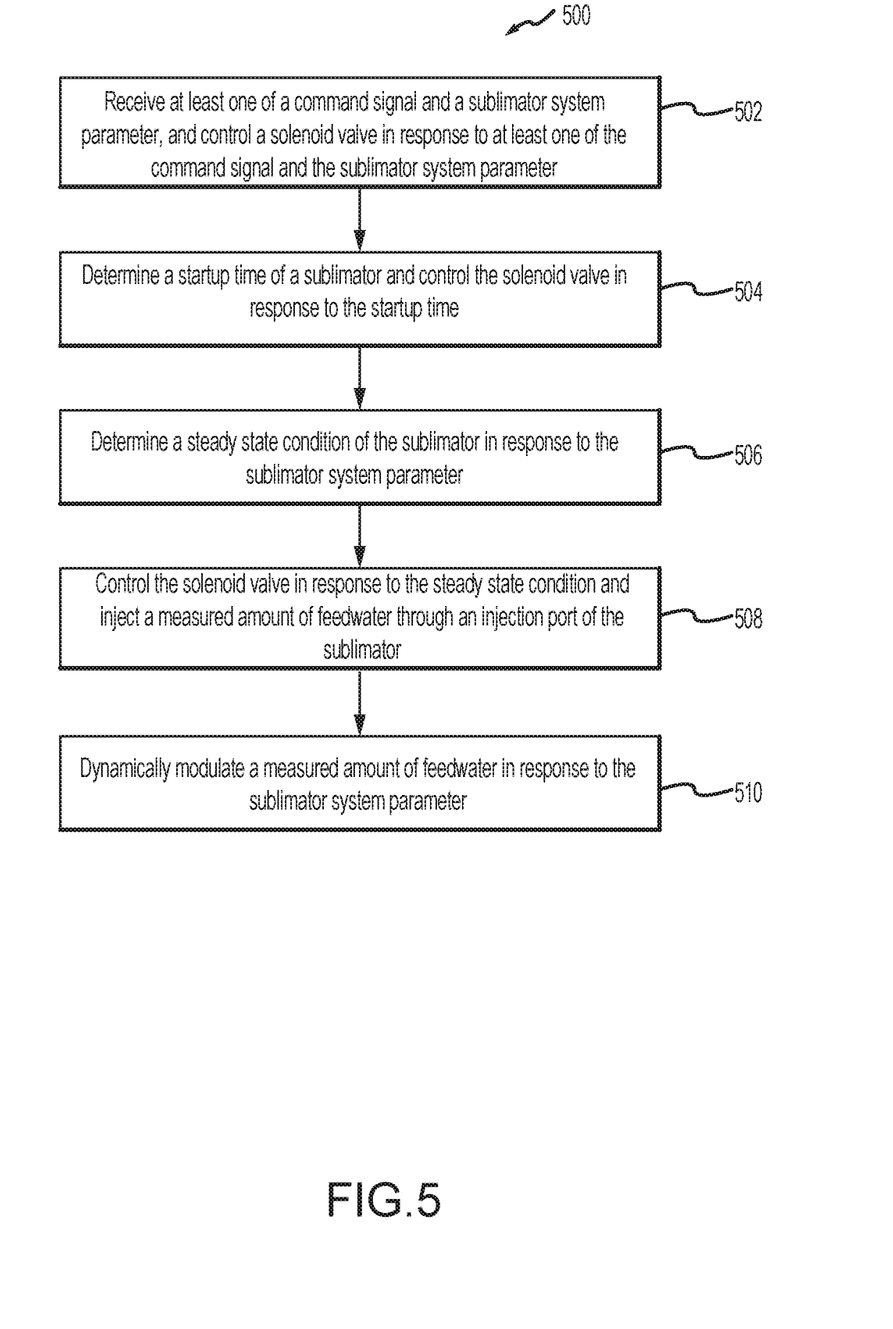
FIG. 5 illustrates a process flow for a method of controlling a sublimator, in accordance with various embodiments.

With reference to FIG. 5, a method 500 for controlling a sublimator system is illustrated in accordance with various embodiments. Method 500 includes receiving, by a controller, a command signal and receiving, by the controller, at least one of a first sublimator system parameter or a second sublimator system parameter from a sensor in electronic communication with the controller, and controlling, by the controller, a first solenoid valve in response to at least one of the command signal, the first sublimator system parameter, or the second sublimator system parameter (step 502), controlling, by the controller, a first solenoid valve in response to at least one of the command signal, the first sublimator system parameter, or the second sublimator system parameter. Method 500 includes determining, by the controller, a startup time and controlling, by the controller, the solenoid valve in response to at least one of the startup time, the first sublimator system parameter, a first pressure threshold, and a feedwater pressure (step 504). Method 500 includes determining, by the controller, a steady state condition of the sublimator (step 506). In various embodiments, the steady state condition of the sublimator may be determined by the controller in response to at least one of the first sublimator system parameter, a second pressure threshold, the second sublimator system parameter, a temperature threshold, or a steady state time function. Method 500 includes controlling, by the controller, the solenoid valve in response to the steady state condition (step 508). In various embodiments, the controlling, by the controller, the first solenoid valve in response to the steady state condition further comprises calculating, by first controller, a measured amount of feedwater, opening, by the controller, the first solenoid valve for a calculated duration and injecting, by the controller, the measured amount of feedwater into the sublimator through the injection port. Method 500 includes dynamically modulating, by the controller, the measured amount of feedwater in response to at least one of the first sublimator system parameter, the feedwater pressure, the second sublimator system parameter, or the second pressure threshold (step 510).

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A sublimator control valve system, comprising:
a sublimator having an injection port;
a feedwater supply;
a first solenoid valve in fluid communication with the feedwater supply and the injection port of the sublimator;
a first sensor in electronic communication with a first controller, the first sensor configured to measure at least one of a first pressure parameter or a first temperature parameter; and
a first tangible, non-transitory memory configured to communicate with the first controller, the first tangible, non-transitory memory having instructions stored thereon that, in response to execution by the first controller, cause the first controller to perform operations comprising:
receiving, by the first controller, a command signal and the first pressure parameter;
controlling, by the first controller, the first solenoid valve in response to at least one of the command signal or the first pressure parameter;
determining, by the first controller, a steady state condition of the sublimator; and
controlling, by the first controller, the first solenoid valve in response to the steady state condition, wherein the controlling, by the first controller, the first solenoid valve in response to the steady state condition further comprises calculating, by the first controller, a measured amount of feedwater, opening, by the first controller, the first solenoid valve for a calculated duration and injecting, by the first controller, the measured amount of feedwater into the sublimator through the injection port.

2. The sublimator control valve system of claim 1, wherein the operations further comprise determining, by the first controller, a startup time and controlling, by the first controller, the first solenoid valve in response to at least one of the startup time, the first pressure parameter, a first pressure threshold, and a feedwater pressure.

3. The sublimator control valve system of claim 1, wherein the steady state condition is determined by the first controller in response to at least one of the first pressure parameter, a second pressure threshold, a temperature parameter, a temperature threshold, or a steady state time function.

4. The sublimator control valve system of claim 1, wherein the measured amount of feedwater is dynamically modulated, by the first controller, in response to at least one of the first pressure parameter, a feedwater pressure, a temperature parameter, or the second pressure threshold.

5. The sublimator control valve system of claim 1, further comprising determining, by the first controller, a breakthrough event in response to a change in a rate of change of the first pressure parameter and controlling, by the first controller, the first solenoid valve.

6. The sublimator control valve system of claim 1, further comprising a first isolation valve in fluid communication with the feedwater supply and the first solenoid valve, wherein the first isolation valve is configured to interrupt the fluid communication between the first solenoid valve and the feedwater supply.

7. The sublimator control valve system of claim 6, further comprising:
  a second solenoid valve in fluid communication with the feedwater supply and the injection port of the sublimator;
  a second isolation valve in fluid communication with the second solenoid valve and the feedwater supply, wherein the second isolation valve is configured to interrupt the fluid communication between the second solenoid valve and the feedwater supply;
  a second sensor in electronic communication with a second controller, the second sensor configured to measure a second pressure parameter; and
  a second tangible, non-transitory memory configured to communicate with the second controller, the second tangible, non-transitory memory having instructions stored thereon that, in response to execution by the second controller, cause the second controller to perform operations comprising:
  receiving, by the second controller, a command signal and the second pressure parameter; and,
  controlling, by the second controller, the second solenoid valve in response to at least one of the command signal or the second pressure parameter.

8. A method for controlling a sublimator system, comprising:
  receiving, by a controller, a command signal and receiving, by the controller, at least one of a first sublimator system parameter or a second sublimator system parameter from a sensor in electronic communication with the controller;
  controlling, by the controller, a solenoid valve in response to at least one of the command signal, the first sublimator system parameter, or the second sublimator system parameter,
  wherein the first sublimator system parameter and the second sublimator system parameter comprise measured characteristics of a spacecraft cooling system having a sublimator control valve system comprising a sublimator having an injection port, a feedwater supply, and the solenoid valve in fluid communication with the feedwater supply and the injection port of the sublimator;
  determining, by the controller, a steady state condition of the sublimator; and
  controlling, by the controller, the solenoid valve in response to the steady state condition,
  wherein the controlling, by the controller, the solenoid valve in response to the steady state condition further comprises calculating, by controller, a measured amount of feedwater, opening, by the controller, the solenoid valve for a calculated duration and injecting, by the controller, the measured amount of feedwater into the sublimator through the injection port.

9. The method of claim 8, further comprising determining, by the controller, a startup time and controlling, by the controller, the solenoid valve in response to at least one of the startup time, the first sublimator system parameter, a first pressure threshold, and a feedwater pressure.

10. The method of claim 8, wherein the steady state condition is determined by the controller in response to at least one of the first sublimator system parameter, a second pressure threshold, the second sublimator system parameter, a temperature threshold, or a steady state time function.

11. The method of claim 8, further comprising dynamically modulating, by the controller, the measured amount of feedwater in response to at least one of the first sublimator system parameter, a feedwater pressure, the second sublimator system parameter, or the second pressure threshold.

12. An article of manufacture including a tangible, non-transitory computer-readable storage medium having instructions stored thereon that, in response to execution by a processor, cause the processor to perform operations comprising:
  receiving, by the processor, a command signal and receiving, by the processor, at least one of a first sublimator system parameter or a second sublimator system parameter from a first sensor in electronic communication with the processor wherein the first sublimator system parameter and the second sublimator system parameter comprise measured characteristics of a spacecraft cooling system having a sublimator control valve system comprising a sublimator having an injection port, a feedwater supply, a solenoid valve in fluid communication with the feedwater supply and the injection port of the sublimator;
  controlling, by the processor, the solenoid valve in response to at least one of the command signal or the first sublimator system parameter;
  determining, by the processor, a steady state condition of the sublimator in response to at least one of the first sublimator system parameter, a pressure threshold, the second sublimator system parameter, a temperature threshold, or a steady state time function; and
  controlling, by the processor, the solenoid valve in response to the steady state condition,
  wherein the controlling, by the processor, the solenoid valve in response to the steady state condition further comprises calculating, by the processor, a measured amount of feedwater, opening, by the processor, the solenoid valve for a calculated duration and injecting, by the processor, the measured amount of feedwater into the sublimator through the injection port.

* * * * *